(12) United States Patent
Song et al.

(10) Patent No.: US 9,902,907 B2
(45) Date of Patent: Feb. 27, 2018

(54) SYSTEM FOR PRODUCING SYNTHESIS GAS FROM BIOMASS

(71) Applicant: WUHAN KAIDI ENGINEERING TECHNOLOGY RESEARCH INSTITUTE CO., LTD., Wuhan (CN)

(72) Inventors: Kan Song, Wuhan (CN); Manyi Jiang, Wuhan (CN); Qin Sun, Wuhan (CN); Shirong Zhang, Wuhan (CN); Haiqing Zhang, Wuhan (CN); Jinqiao Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 89 days.

(21) Appl. No.: 14/981,984

(22) Filed: Dec. 29, 2015

(65) Prior Publication Data

US 2016/0108319 A1 Apr. 21, 2016

Related U.S. Application Data

(60) Division of application No. 13/624,993, filed on Sep. 24, 2012, now Pat. No. 9,249,358, which is a
(Continued)

(30) Foreign Application Priority Data

Mar. 23, 2010 (CN) .......................... 2010 1 0132481

(51) Int. Cl.
*C10B 53/02* (2006.01)
*C10B 49/22* (2006.01)
(Continued)

(52) U.S. Cl.
CPC ................ *C10B 53/02* (2013.01); *C01B 3/22* (2013.01); *C10B 49/22* (2013.01); *C10C 5/00* (2013.01); *C10K 1/026* (2013.01); *C10K 1/04* (2013.01); *C10K 1/06* (2013.01); *C01B 2203/0272* (2013.01); *C10G 2300/1011* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,678,860 A * | 7/1987 | Kuester | ................. | C07C 1/0435 518/704 |
| 5,504,259 A * | 4/1996 | Diebold | ................. | C10B 49/12 568/697 |
| 5,853,548 A * | 12/1998 | Piskorz | ................. | B01J 8/1836 201/25 |
| 6,814,940 B1 * | 11/2004 | Hiltunen | ............... | B01J 8/0055 422/140 |
| 2006/0112639 A1 * | 6/2006 | Nick | .......................... | C10J 3/08 48/198.1 |
| 2007/0245934 A1 * | 10/2007 | Carman | .................... | C10J 3/26 110/229 |

(Continued)

*Primary Examiner* — Imran Akram
(74) *Attorney, Agent, or Firm* — Matthias Scholl P.C.; Matthias Scholl

(57) ABSTRACT

A gasification system for producing synthetic gas from biomass, including: a biomass material pre-processing part; a pyrolysis part; a condensing part; and a gasification part. The pyrolysis part includes a pyrolysis bed and a combustion bed. The condensate tank of the condensing part is connected to a non-condensable pyrolysis gas compressor via a pipeline; an output of the non-condensable pyrolysis gas compressor is connected to the pyrolysis bed and the combustion bed. The non-condensable pyrolysis gas acts as a fuel of the combustion bed and a fluidizing medium of the pyrolysis bed.

7 Claims, 1 Drawing Sheet

Related U.S. Application Data continuation-in-part of application No. PCT/CN2011/072061, filed on Mar. 23, 2011.

(51) Int. Cl.
*C10K 1/02* (2006.01)
*C10K 1/04* (2006.01)
*C10K 1/06* (2006.01)
*C10C 5/00* (2006.01)
*C01B 3/22* (2006.01)

(52) U.S. Cl.
CPC ............ *Y02E 50/14* (2013.01); *Y02P 20/129* (2015.11); *Y02P 20/145* (2015.11); *Y02P 30/20* (2015.11)

(56) References Cited

U.S. PATENT DOCUMENTS

| | | | | |
|---|---|---|---|---|
| 2008/0006519 | A1* | 1/2008 | Badger | C10B 49/20 202/96 |
| 2008/0016769 | A1* | 1/2008 | Pearson | C10J 3/466 48/197 R |
| 2009/0227766 | A1* | 9/2009 | Bridgwater | C10B 53/02 530/202 |
| 2011/0132737 | A1* | 6/2011 | Jadhav | C01B 31/20 201/28 |
| 2013/0000569 | A1* | 1/2013 | Schneider | F02B 43/08 123/3 |

* cited by examiner

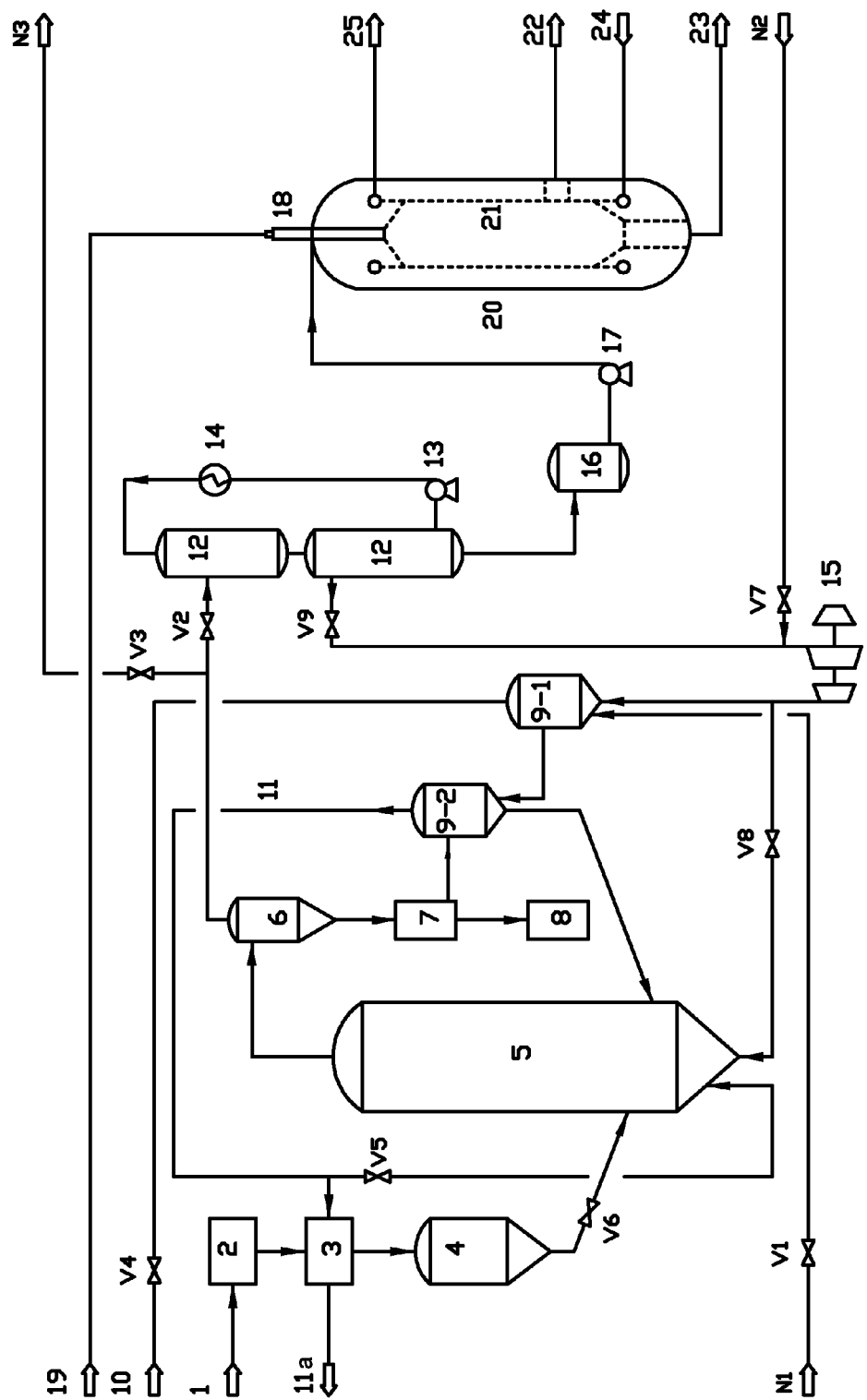

SYSTEM FOR PRODUCING SYNTHESIS GAS FROM BIOMASS

CROSS-REFERENCE TO RELATED APPLICATIONS

The application is a divisional of U.S. Ser. No. 13/624,993 filed on Sep. 24, 2012, now pending, which is a continuation-in-part of International Patent Application No. PCT/CN2011/072061 with an international filing date of Mar. 23, 2011, which is based on Chinese Patent Application No. 201010132481.3 filed Mar. 23, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a system for producing synthetic gas from biomass by pyrolysis.

Description of the Related Art

The gasification furnace used in the gasification process can be divided into three classes: fixed bed, fluidized bed, and entrained flow bed. However, they have the following defects.

The fixed bed has non-uniform temperature and low heat exchange efficiency, and the synthesis gas at the outlet has low heating value and contains a large amount of tar.

The fluidized bed is sensitive to the characteristics of raw materials, and in order to ensure normal fluidization of the gasification furnace, low temperature must be maintained; as a result, a large amount of tar is produced.

The entrained flow bed has a high and uniform operating temperature, so that tar is cracked completely. However, the entrained flow bed has a strict requirement on particle size of raw materials, to obtain ultrafine particles, complex grinding devices are involved, which increases the production costs.

SUMMARY OF THE INVENTION

In view of the above-described problems, it is one objective of the invention to provide a system for producing synthetic gas from biomass that have high pyrolysis efficiency and low cost.

To achieve the above objective, in accordance with one embodiment of the invention, there is provided a gasification system for producing synthetic gas from biomass. The system comprises a biomass material pre-processing part, a pyrolysis part, a condensing part, and a gasification part. The pyrolysis part comprises a pyrolysis bed and a combustion bed; a condensate tank of the condensing part is connected to a non-condensable pyrolysis gas compressor via a pipeline; an output of the non-condensable pyrolysis gas compressor is respectively connected to the pyrolysis bed and the combustion bed; a non-condensable pyrolysis gas acts as a fuel of the combustion bed and a fluidizing medium of the pyrolysis bed.

In a class of this embodiment, the condensing part adopts a spray condensation in an external circulation mode. A lower part of the condensate tank is connected to an oil circulating pump via a pipeline, and the oil circulating pump is connected to the external fuel oil heat exchanger; one part of the fuel oil is pressurized by the oil circulating pump and cooled by the fuel oil heat exchanger, so as to circularly spray the pyrolysis gas, and a lower part of the condensate tank is connected to a fuel oil tank.

In a class of this embodiment, the pyrolysis bed is connected to the cyclone separator and the solid-solid separator. The solid-solid separator is connected to the carbon powder stock bin and the carrier heating fluidized bed. A lower part of the carrier heating fluidized bed is provided with a pipeline connected to the pyrolysis bed, so as to convey the heated solid carrier to the pyrolysis bed for recycling use.

In a class of this embodiment, a top part of the carrier heating fluidized bed is connected to a drying system of the biomass material pre-processing part through a waste heat and smoke pipeline, and an upper part of the combustion bed is connected to an air intake pipeline.

In a class of this embodiment, a pipeline connecting an outlet of the fuel oil tank and a gasification furnace is provided with the high pressure oil pump, and the fuel oil is pressurized and conveyed to the gasification furnace for gasification.

Advantages of the invention are summarized below:

First, the invention adopts fast pyrolysis technology, and can directly transform biomass into fuel oil, which improves the volume energy density of the biomass and makes transportation and storage convenient; on the other hand, high energy yield (60-80%) can be realized at the temperature of 400-600° C., which reduces the energy consumption and also can improve the carbon conversion rate of the whole system.

Second, the invention also adopts the technology of heating the cyclic solid heat carrier as heat source of the pyrolysis bed by using the heat generated by combustion of self-produced non-condensable pyrolysis gas. The pyrolysis bed heating technology of the invention has the following three features: 1) the heat needed by the pyrolysis technique is provided by the inner part of the system so as to realize the thermal equilibrium of the system and not to introduce external energy fundamentally; 2) the heat for heating the cyclic solid heat carrier is provided by direct combustion of the non-condensable pyrolysis gas and air. That is to say, the chemical energy of the pyrolysis gas is used, and on the other hand, air, instead of pure oxygen, is used, which greatly reduces the cost of the whole system and increases the use flexibility of the pyrolysis bed; 3) the heated cyclic solid heat carrier is directly conveyed to the pyrolysis bed to contact the raw material, which not only increases the heating efficiency of the pyrolysis bed but also improves the oil yield of the fast pyrolysis reaction.

Third, the invention uses the waste heat smoke generated by combustion of the non-condensable pyrolysis gas to dry the raw material, which improves the energy efficiency of the whole system.

Fourth, the invention does not adopt the process of pre-processing the raw material at the inlet of the gasification furnace. The raw material is directly fed to the gasification furnace after being pressurized by the high pressure oil pump. The process is simple and efficient. The method avoids the technical problem about pneumatic conveying of powder and tar blockage when feeding dry carbon powder, as well as greatly reduces the energy consumption of the inlet raw material and increases the stability, reliability and feasibility of the system.

Fifth, the invention adopts external-cyclic spray condensation. The fuel oil heat exchanger is arranged outside the condensate tank, which is convenient for cleaning and maintenance and also avoids stopping for maintenance.

Sixth, the invention adopts the technology of oil pump pressurizing and transportation. The method avoids the technical problem about pneumatic conveying of powder and tar blockage when feeding dry carbon powder, and also increases the stability, reliability and feasibility of the system.

Seventh, with the fast pyrolysis technology, the generated fuel oil nearly does not contain coal slag, which saves the trouble of high ash melting point in the process of making synthesis gas from biomass. The follow-up slag discharging system for the gasification furnace is also not needed, which prevents corrosion of alkali metal and ash accumulation and also increases the stability, reliability and feasibility of the system.

In short, the invention aims to realize simplicity, efficiency, energy conservation, economy and high project feasibility. Meanwhile, the invention enhances the gasification efficiency, decreases the amount of effective synthesis gas and improves the energy conversion rate of the system.

BRIEF DESCRIPTION OF THE DRAWINGS

The invention is described hereinbelow with reference to accompanying drawings, in which the sole FIGURE is a schematic diagram of a method and a system for producing synthetic gas from biomass by pyrolysis according to one embodiment of the invention.

DETAILED DESCRIPTION OF THE EMBODIMENTS

For further illustrating the invention, experiments detailing a method and a gasification system for producing synthesis gas from biomass are described below. It should be noted that the following examples are intended to describe and not to limit the invention.

As shown in the FIGURE, a gasification system for producing synthesis gas from biomass comprises a biomass material pre-processing part, a pyrolysis part, a condensing part, and a gasification part. Specifically, the gasification system comprises: a biomass raw material 1, a crushing system 2, a drying system 3, a biomass stock bin 4, a pyrolysis bed 5, a cyclone separator 6, a solid-solid separator 7, a carbon powder stock bin 8, a combustion bed 9-1, a carrier heating fluidized bed 9-2, an air intake pipeline 10 leading to the combustion bed, a waste heat and smoke pipeline 11, a waste heat smoke outlet of the drying system 11a, a condensate tank 12, an oil circulating pump 13, a fuel oil heat exchanger 14, a non-condensable pyrolysis gas compressor 15, a fuel oil tank 16, a high pressure oil pump 17, a gasification furnace burner 18, an oxygen pipeline 19 leading to the gasification furnace burner, a gasification furnace 20, a water cooling water of gasification furnace 21, a synthesis gas pipeline 22, a coal slag pipeline 23, a desalted and deoxidized water pipeline 24, a saturate water vapor pipeline 25, an external fuel pipeline N1, an air pipeline N2 leading to the combustion bed, and an emptying pipeline N3.

The pyrolysis part comprises the pyrolysis bed 5, the combustion bed 9-1, and the carrier heating fluidized bed 9-2. The pyrolysis bed 5 is connected to the cyclone separator 6 and the solid-solid separator 7. The solid-solid separator 7 is connected to the carbon powder stock bin 8 and the carrier heating fluidized bed 9-2. The lower part of the carrier heating fluidized bed 9-2 is provided with a pipeline connected to the pyrolysis bed 5 so as to convey the heated solid carrier to the pyrolysis bed 5 for recycling use.

The top part of the carrier heating fluidized bed 9-2 is connected to the drying system 3 of the biomass material pre-processing part through the waste heat and smoke pipeline 11. The upper part of the combustion bed 9-1 is connected to an air intake pipeline 10.

The condensate tank 12 of the condensing part is connected to the non-condensable pyrolysis gas compressor 15 via a pipeline. The output of the non-condensable pyrolysis gas compressor 15 is respectively connected to the pyrolysis bed 5 and the combustion bed 9-1. The non-condensable pyrolysis gas is used as the fuel of the combustion bed 9-1 and the fluidizing medium of the pyrolysis bed 5.

The spray condensation adopts an external circulating method. The lower part of the condensate tank 12 is connected to the oil circulating pump 13 via a pipeline. The oil circulating pump 13 is connected to the external fuel oil heat exchanger 14. One part of the fuel oil is pressurized by the oil circulating pump 13 and cooled by the fuel oil heat exchanger 14 so as to circularly spray the pyrolysis gas. The lower part of the condensate tank 12 is connected to the fuel oil tank 16.

The pipeline connecting the outlet of the fuel oil tank 16 and the gasification furnace 20 is provided with the high pressure oil pump 17. The fuel oil is pressurized and conveyed to the gasification furnace 20 for gasification.

A method for producing synthesis gas from biomass by pyrolysis comprises steps as follows:

1) pre-processing the biomass raw material: crushing the biomass raw material to have particle sizes of 1-6 mm and drying the raw material till water content is 10-20 wt. %;
2) pyrolyzing the biomass raw material using fast biomass pyrolysis technology, guaranteeing that the temperature of the pyrolysis bed is at 400-600° C. by adjusting the ratio of the non-condensable pyrolysis gas to air and controlling the temperature of the carrier heating fluidized bed, the residence time of gas phase in the pyrolysis bed is 0.5-5 s and the product of the pyrolysis bed is pyrolysis gas and carbon powder;
3) separating the pyrolysis gas from the carbon powder and the solid heat carrier via the cyclone separator;
4) separating the carbon powder away from the solid heat carrier via the solid-solid separator, feeding the carbon powder to the carbon powder stock bin for collection, heating the solid heat carrier in the carrier heating fluidized bed and then conveying the solid heat carrier to the pyrolysis bed for recycling use;
5) conveying the generated pyrolysis gas to the condensate tank for spray condensation, condensing the condensable part in the pyrolysis gas to generate fuel oil, pressurizing the generated fuel oil by the high pressure oil pump and then feeding to the gasification furnace to be gasified; and
6) feeding one part of the non-condensable pyrolysis gas to the combustion bed to combust with air, conveying the other part of the non-condensable pyrolysis gas to the pyrolysis bed as the fluidizing medium.

The spray condensation adopts an external circulating method. The fuel oil at the bottom of the condensate tank is pressurized and pumped by the oil pump and the fuel oil is returned to the condensate tank for spray condensation after being cooled by the external fuel oil heat exchanger. One part of the condensable pyrolysis gas is condensed to generate fuel oil. One part of the fuel oil is fed to the fuel oil tank and the other part is pressurized by the oil circulating pump and cooled by the fuel oil heat exchanger to circularly spray the pyrolysis gas.

The waste heat smoke generated in the carrier heating fluidized bed in step 2) is used to dry the biomass raw material in step 1) for pre-processing biomass raw material.

Working Process:

1. System Start-Up Process:
   1) opening the control valve V3 on the emptying pipeline N3, keeping the control valve V2 leading to the condensate tank 12 and the control valve V9 on the pipeline between the condensate tank 12 and the non-condensable pyrolysis gas compressor 15 closed;
   2) opening the control valve V1 on the external fuel pipeline N1 and the control valve V7 on the air pipeline N2 leading to the combustion bed, keeping the control valve V8 on the pipeline between the non-condensable pyrolysis gas compressor 15 and the pyrolysis bed 5 closed so as to feed the heat smoke generated by combustion of fuel and air in the combustion bed 9-1 to the carrier heating fluidized bed 9-2 to heat the solid heat carrier;
   3) opening the control valve V5 on the waste heat smoke pipeline between the carrier heating fluidized bed 9-2 and the pyrolysis bed 5 and the control valve V6 on the pipeline between the biomass stock bin 4 and the pyrolysis bed 5 to feed partial waste heat smoke into the drying system 3 to dry the biomass raw material, feeding partial waste heat smoke to the pyrolysis bed 5 as fluidizing medium, separating solid from the mixed pyrolysis gas generated by reaction in the pyrolysis bed 5 via the cyclone separator 6 and then discharging out of the system through the pipeline N3; and
   4) opening the control valve V2 after implementing steps 1), 2), and 3) for 10-20 minutes, cooling the pyrolysis gas via spraying of the condensate tank 12, collecting the fuel oil; after running for 15-30 min, opening the control valve V9, closing the control valves V1, V5, and V7, opening the control valves V4 and V8 at the same time; the system begins to normally run in the circumstance.

2. Normal Operation Process of System:

The biomass raw material is fed to the drying system 3 via the crushing system 2. The biomass raw material is dried and dehydrated by the heat smoke in the system and then is conveyed to the biomass stock bin 4 for storage. It also can be conveyed to the pyrolysis bed 5 by a feeder.

The product of the pyrolysis bed 5 comprises pyrolysis gas and carbon powder containing CO, $H_2$, $CO_2$, $H_2O$, $CH_4$, and tar. The coarse pyrolysis gas is separated by the cyclone separator 6 and then the solid heat carrier and carbon powder particles in the coarse pyrolysis gas drop in the solid-solid separator 7 via the ash discharging port.

The primarily separated pyrolysis gas is fed to the condensate tank 12 to be circularly sprayed by the fuel oil. The non-condensable pyrolysis gas is pressurized in the non-condensable pyrolysis gas compressor 15 and then respectively fed to the combustion bed 9-1 and the pyrolysis bed 5. The condensable pyrolysis gas is condensed to generate fuel oil. Part of the generated fuel oil can be used for cyclic spray. The rest is generated into fuel oil and fed to the fuel oil tank 16.

After the solid heat carrier and the carbon powder in the solid-solid separator 7 are separated, the solid heat carrier drops into the carrier heating fluidized bed 9-2 and the carbon powder is fed to the carbon powder stock pin 8.

In the combustion bed 9-1, the non-condensable pyrolysis gas for combustion undergoes combustion reaction with the air from the pipeline 10. The heat smoke generated by combustion is fed to the carrier heating fluidized bed 9-2 to heat the cyclic solid heat carrier. The temperature of the pyrolysis bed 5 is controlled as 400-600° C. by adjusting the ratio of the non-condensable pyrolysis gas generated by combustion to air. The residence time of gas phase in the pyrolysis bed 5 is controlled to be 0.5-5 s. The waste heat smoke passing the carrier heating fluidized bed 9-2 is fed to the drying system 3 for drying.

The pressure of the fuel oil in the fuel oil tank 16 is first raised to be equal to the working pressure of the gasification furnace 20 by the high pressure oil pump 17 and then it is fed to the gasification furnace burner 18. The oxygen in the pipeline 19 is also fed to the gasification furnace burner 18 to generate high temperature gasification reaction in the gasification 20. The temperature of the synthesis gas 22 at the outlet of the gasification furnace is controlled at 1200-1600° C. by adjusting the quantity of the oxygen and the heat exchanging amount of the water cooling wall 21 of the gasification furnace filled with desalted and deoxidized water. The gasification product mainly refers to CO and $H_2$ and also comprises a little $CO_2$ and $H_2O$ and trace amount of $CH_4$. The desalted and deoxidized water is cooled by the water cooling wall 21 of the gasification furnace to generate intermediate pressure saturated water vapor, which is fed to the follow-up system through the pipeline 25. The coal slag generated by gasification is discharged via the pipeline 23.

Example 1

Take wood as a raw material of biomass. The elemental composition and characteristic data of the dried wood are listed in Table 1.

TABLE 1

Elemental composition and characteristic data of the dried wood

| Items | Symbol | Unit | Value |
|---|---|---|---|
| Carbon | $C_{ar}$ | % (Kg/Kg) | 39.43 |
| Hydrogen | $H_{ar}$ | % (Kg/Kg) | 5.21 |
| Oxygen | $O_{ar}$ | % (Kg/Kg) | 38.36 |
| Nitrogen | $N_{ar}$ | % (Kg/Kg) | 0.15 |
| Sulfur | $S_{ar}$ | % (Kg/Kg) | 0.21 |
| Chlorine | $Cl_{ar}$ | % (Kg/Kg) | 0.00 |
| Ash | $A_{ar}$ | % (Kg/Kg) | 5.00 |
| Moisture | $M_{ar}$ | % (Kg/Kg) | 11.64 |
| Ash fusion point | FT | ° C. | 1436 |
| Low heat value | LHV | MJ/Kg | 14.75 |

The main operating conditions are set as follows:
1) the grain diameter of the material at the outlet of the crushing system 2 is 6 mm;
2) the water content of the material at the outlet of the drying system 3 is 15 wt. %;
3) the pressure of the pyrolysis bed 5 is normal pressure and the temperature is controlled at 400° C.;
4) gas phase residence time of the pyrolysis bed 5 is 5 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:

1) fuel quality yield of the biomass raw material fed to the pyrolysis bed 5 is 55%;
2) dry basis content of CO and $H_2$ in the synthesis gas output by the pipeline 22 is 76%; and
3) the carbon conversion rate of the system is 99.9% and the effective oxygen consumption of the synthesis gas is 0.33 mol/mol.

Example 2

Take wood in Example 1 as a raw material of biomass (Table 1).
The main operating conditions are set as follows:
1) the grain diameter of the material at the outlet of the crushing system 2 is 5 mm;
2) the water content of the material at the outlet of the drying system 3 is 20 wt. %;
3) the pressure of the pyrolysis bed 5 is normal pressure and the temperature is controlled at 500° C.;
4) gas phase residence time of the pyrolysis bed 5 is 3 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) fuel quality yield of the biomass raw material fed to the pyrolysis bed 5 is 60%;
2) dry basis content of CO and $H_2$ in the synthesis gas output by the pipeline 22 is 80%; and
3) the carbon conversion rate of the system is 99.9% and the effective oxygen consumption of the synthesis gas is 0.31 mol/mol.

Example 3

Take wood in Example 1 as a raw material of biomass (Table 1).
The main operating conditions are set as follows:
1) the grain diameter of the material at the outlet of the crushing system 2 is 4 mm;
2) the water content of the material at the outlet of the drying system 3 is 10 wt. %;
3) the pressure of the pyrolysis bed 5 is normal pressure and the temperature is controlled at 600° C.;
4) gas phase residence time of the pyrolysis bed 5 is 2 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) fuel quality yield of the biomass raw material fed to the pyrolysis bed 5 is 65%;
2) dry basis content of CO and $H_2$ in the synthesis gas output by the pipeline 22 is 82%; and
3) the carbon conversion rate of the system is 99.9% and the effective oxygen consumption of the synthesis gas is 0.31 mol/mol.

Example 4

Take wood in Example 1 as a raw material of biomass (Table 1).
The main operating conditions are set as follows:
1) the grain diameter of the material at the outlet of the crushing system 2 is 3 mm;
2) the water content of the material at the outlet of the drying system 3 is 13 wt. %;
3) the pressure of the pyrolysis bed 5 is normal pressure and the temperature is controlled at 450° C.;
4) gas phase residence time of the pyrolysis bed 5 is 1 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) fuel quality yield of the biomass raw material fed to the pyrolysis bed 5 is 66%;
2) dry basis content of CO and $H_2$ in the synthesis gas output by the pipeline 22 is 84%; and
3) the carbon conversion rate of the system is 99.9% and the effective oxygen consumption of the synthesis gas is 0.3 mol/mol.

Example 5

Take wood in Example 1 as a raw material of biomass (Table 1).
The main operating conditions are set as follows:
1) the grain diameter of the material at the outlet of the crushing system 2 is 2 mm;
2) the water content of the material at the outlet of the drying system 3 is 16 wt. %;
3) the pressure of the pyrolysis bed 5 is normal pressure and the temperature is controlled at 550° C.;
4) gas phase residence time of the pyrolysis bed 5 is 1.5 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) fuel quality yield of the biomass raw material fed to the pyrolysis bed 5 is 70%;
2) dry basis content of CO and $H_2$ in the synthesis gas output by the pipeline 22 is 86%; and
3) the carbon conversion rate of the system is 99.9% and the effective oxygen consumption of the synthesis gas is 0.3 mol/mol.

Example 6

Take wood in Example 1 as a raw material of biomass (Table 1).
The main operating conditions are set as follows:
1) the grain diameter of the material at the outlet of the crushing system 2 is 1 mm;
2) the water content of the material at the outlet of the drying system 3 is 18 wt. %;
3) the pressure of the pyrolysis bed 5 is normal pressure and the temperature is controlled at 520° C.;
4) gas phase residence time of the pyrolysis bed 5 is 0.5 s; and 5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:

1) fuel quality yield of the biomass raw material fed to the pyrolysis bed 5 is 75%;
2) dry basis content of CO and $H_2$ in the synthesis gas output by the pipeline 22 is 90%; and
3) the carbon conversion rate of the system is 99.9% and the effective oxygen consumption of the synthesis gas is 0.285 mol/mol.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A gasification system for producing synthesis gas from biomass, the system comprising:
   a biomass material pre-processing part, the biomass material pre-processing part comprising a crushing system, a drying system, and a biomass stock bin;
   a pyrolysis part, the pyrolysis part comprising a pyrolysis bed, a carrier heating fluidized bed, and a separating system;
   a combustion bed;
   a condensing part, the condensing part comprising a condensate tank, an oil circulating pump, and a fuel oil heat exchanger; the condensate tank comprising a first portion and a second portion;
   a non-condensable pyrolysis gas compressor;
   a waste gas pipe; and
   a gasification part, the gasification part comprising a fuel oil tank and a gasification furnace;
   wherein
   the crushing system is connected to the drying system;
   the drying system is connected to the biomass stock bin;
   the biomass stock bin is connected to the pyrolysis bed via a first pipe;
   the pyrolysis bed is connected to the separating system;
   the separating system is connected to the carrier heating fluidized bed;
   the carrier heating fluidized bed is connected to the drying system through the waste gas pipe;
   the combustion bed is connected to the carrier heating fluidized bed;
   the separating system is connected to the first portion;
   the first portion is connected to the second portion;
   the second portion is connected to the oil circulating pump;
   the oil circulating pump is connected to the fuel oil heat exchanger;
   the fuel oil heat exchanger is connected to the first portion;
   the second portion is connected to the non-condensable pyrolysis gas compressor;
   the second portion is connected to the fuel oil tank;
   the fuel oil tank is connected to the gasification furnace via a second pipe; and
   an output of the non-condensable pyrolysis gas compressor is connected to the pyrolysis bed and the combustion bed.

2. The system of claim 1, wherein when in use, one part of fuel oil in the condensate tank is pressurized by the oil circulating pump and cooled by the fuel oil heat exchanger and is then sprayed to the pyrolysis gas in the first portion.

3. The system of claim 2, wherein the separating system comprises a cyclone separator and a solid-solid separator, the pyrolysis bed is connected to the cyclone separator, the cyclone separator is connected to the solid-solid separator, the solid-solid separator is connected to a carbon powder stock bin and the carrier heating fluidized bed, a lower part of the carrier heating fluidized bed is connected to the pyrolysis bed, to convey a heated solid carrier to the pyrolysis bed for recycling use.

4. The system of claim 3, wherein an upper part of the combustion bed is connected to an air intake pipeline.

5. The system of claim 2, wherein the second pipe is provided with an oil pump.

6. The system of claim 1, wherein the separating system comprises a cyclone separator and a solid-solid separator, the pyrolysis bed is connected to the cyclone separator, the cyclone separator is connected to the solid-solid separator, the solid-solid separator is connected to a carbon powder stock bin and the carrier heating fluidized bed, a lower part of the carrier heating fluidized bed is connected to the pyrolysis bed, to convey a heated solid carrier to the pyrolysis bed for recycling use.

7. The system of claim 6, wherein an upper part of the combustion bed is connected to an air intake pipeline.

* * * * *